United States Patent Office 3,677,811
Patented July 18, 1972

3,677,811
ANTISTATIC THERMOPLASTIC
POLYMER FILM
John Alan Elliott Kail, Welwyn Garden City, England, assignor to Imperial Chemical Industries Limited, London, England
No Drawing. Filed Sept. 22, 1969, Ser. No. 860,031
Claims priority, application Great Britain, Oct. 1, 1968, 46,530/68
Int. Cl. C08f *3/08, 45/00*
U.S. Cl. 117—138.8 E      7 Claims

ABSTRACT OF THE DISCLOSURE

Antistatic composition comprising a mixture of a compound of the formula

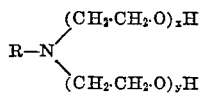

wherein the sum of $x$ and $y$ has a value from 2 to 5 inclusive and R is a monovalent aliphatic radical having from 12 to 22 carbon atoms and one or more glycerides, and the use of these compositions for rendering films antistatic either by incorporating in the film or coating onto the film.

---

The present invention relates to compositions which are suitable for rendering films of thermoplastic polymers antistatic and to films of thermoplastic polymers having the antistatic compositions coated thereon or incorporated therein. By rendering a film antistatic we mean that the tendency for static electricity to accumulate on the surface of the film is reduced. A reduction in this tendency is consistent with a reduction in the surface resistivity of the film.

An aim of the present invention is to provide antistatic compositions which when included in films of thermoplastic materials tend to develop antistatic properties at a greater rate than previously known antistatic compositions.

According to the present invention we provide a composition suitable for rendering films of thermoplastic polymers antistatic comprising in admixture one or more substances having the formula

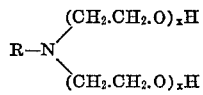

wherein the sum of $x$ and $y$ has a value from 2 to 5 inclusive and R is a monovalent aliphatic radical having from 12 to 22 carbon atoms inclusive and one or more glycerides.

The present invention also provides films of thermoplastic polymers having incorporated therein from .01% to 2.0% by weight of one or more substances having the formula

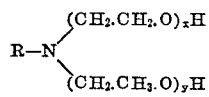

where the sum of $x$ and $y$ has a value from 2 to 5 inclusive and R is a monovalent aliphatic radical having from 12 to 22 carbon atoms and from 0.1% to 5% by weight of a glyceride, the percentages being based on the weight of the film.

The present invention further provides films of thermoplastic polymers having coated thereon a composition comprising a mixture of one or more substances having the formula

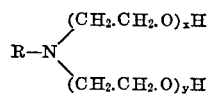

wherein the sum of $x$ and $y$ has a value from 2 to 5 inclusive and R is a monovalent aliphatic radical having from 12 to 22 carbon atoms inclusive and one or more glycerides.

The radical R may be any monovalent aliphatic radical having from 12 to 22 carbon atoms and includes acyl radicals derived from fatty acids having from 12 to 22 carbon atoms inclusive.

The antistatic compositions of the present invention are particularly suitable for rendering films of thermoplastic polymers antistatic and are especially useful with films of crystalline polymers of α-olefines, such as polymers and copolymers of ethylene, propylene, butene and 4-methyl pentene-1, especially polypropylene. Although particularly useful with these polymers the antistatic agents may also be used with other polymers such as low density polythene, polymers and copolymers of vinyl chloride, polymers and copolymers of vinylidene chloride polymers and copolymers of styrene and linear crystal forming polyesters such as polyethylene terephthalate. The polymer may also contain other additives to improve the properties of the film such as pigments, light stabilisers and polyterpenes.

The film containing or coated with the antistatic agents may subsequently be treated to improve the adhesive properties of its surface. For example, the film may be subjected to corona discharge treatment to improve the ink take of the surface or to render the surface of the film more receptive to coatings. We have found that subjecting film containing the antistatic agents of the present invention to corona discharge treatment speeds up the development of antistatic properties.

The glycerides used in the composition of the present invention may be a mono-, di-, or tri-glyceride or a mixture of one or more mono-, di- or tri-glycerides. We have found that a particularly useful component is a mixture of mono- and di-glycerides containing mainly glyceryl mono-stearate, another particularly suitable glyceride is glyceryl mono-behenate. If a di- or tri-glyceride is used it may be a simple glyceride in which the fatty acid residues are identical or may be a mixed glyceride. If a mixed tri-glyceride is used two of the fatty acid residues may be the same or all three may be different. We prefer that the glycerides used are long chain glycerides and are non-volatile, preferably solid at the temperatures used in the processing of the films. The disadvantage of using volatiles is that they tend to cause foaming in the film. We prefer that when the antistatic compositions are incorporated into films of thermoplastic polymers the total amount of the glyceride in the film should be between 0.1% and 5% by weight, preferably between 0.5% and 5% by weight of the film.

We have found that the speed of development of antistatic properties of thermoplastic films and especially polypropylene films which contain up to 5% of a glyceride is increased if a compound of the general formula

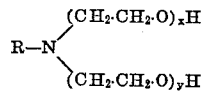

as hereinbefore defined is also incorporated into the film. We have found that the antistatic properties are particularly improved if between 0.01 and 2.0% preferably between 0.05 and 1.0% by weight of the film of this compound is included. In particular we have found that by using the mixture of antistatic agents of the present invention the film acquires antistatic properties at a greater rate than is the case if a corresponding amount of one only of the agents is used. Two particularly suitable compounds falling within this general formula are bis(2-hydroxyethyl)myristyl amine and bis(2-hydroxyethyl)tallow amine.

The antistatic compositions of the present invention may be coated onto a film of a thermoplastic material and in this embodiment of the present invention the antistatic composition may conveniently be incorporated in a coating of a heat-sealable polymer or copolymer that is applied to the film. Many films of thermoplastic materials are biaxially oriented and they tend to lose their orientation when heated to a temperature near their melting point. Thus, if the films are to be sealed by the application of heat it is necessary to coat them with a material which may be sealed at a lower temperature; the antistatic agents of the present invention may conveniently be included in that coating. Oriented films are produced by stretching a sheet or tube of the polymeric material within a certain temperature range and if biaxially oriented film is to be produced the film is stretched in two directions in its plane and this stretching may be effected simultaneously or sequentially. The heat seal coating material containing the antistatic composition may be applied to the film before or after any stretching operation, or in the case of sequential stretching in two directions, between the two stretching operations.

The present invention is illustrated but in no way limited by reference to the accompanying examples.

EXAMPLE 1

Various samples of biaxially oriented polypropylene film containing polyterpene and differing amounts of a mixture of mono- and di-glycerides of fatty acids which was mainly glyceryl monostearate and bis-2-hydroxyethyl tallow amine were prepared by the well known tubular process, the films were discharge treated and the surface resistivity of the film after various periods of time was measured at 50% relative humidity on a Lemouzy iso-R-Meter using 5 inch long electrodes spaced 5 inches apart on the surface of the film with a potential difference of 500 volts between them.

The surface resistivities of the films are set out in the following table.

TABLE 1

| Sample | Percent bis (2-hydroxy ethyl) myristyl amine | Percent mixture of mono- and di-glycerides, mainly glyceryl monostearate | Surface resistivity, Ω/sq., after— | |
|---|---|---|---|---|
| | | | 1 week | 4 weeks |
| 1 | 0.1 | | ∞ | ∞ |
| 2 | | 1 | ∞ | 5.10$^{14}$ |
| 3 | | 2 | ∞ | 4.10$^{12}$ |
| 4 | | 3 | ∞ | 1.10$^{11}$ |
| 5 | 0.1 | 1 | 2.10$^{12}$ | 3.10$^{12}$ |
| 6 | 0.1 | 2 | 4.10$^{10}$ | 6.10$^{10}$ |
| 7 | 0.1 | 3 | 9.10$^{9}$ | 2.10$^{10}$ |

EXAMPLE 2

Example 1 was repeated but using bis-2 hydroxyethyl tallow amine in place of the bis-2 hydroxyethyl myristyl amine.

The results are set out in the following table.

| Sample | Percent bis-2 hydroxyethyl tallow amine | Percent glycerides | Surface resistivity, Ω/sq., after— | |
|---|---|---|---|---|
| | | | 1 week | 5 weeks |
| 1 | 0.5 | | ∞ | ∞ |
| 2 | | 1 | ∞ | 5.10$^{14}$ |
| 3 | | 2 | ∞ | 2.10$^{12}$ |
| 4 | | 3 | ∞ | 7.10$^{10}$ |
| 5 | 0.3 | 1 | ∞ | 1.10$^{11}$ |
| 6 | 0.3 | 2 | ∞ | 6.10$^{9}$ |
| 7 | 0.3 | 3 | ∞ | 2.10$^{10}$ |

EXAMPLE 3

Example 2 was repeated using polyterpene free polypropylene. The results obtained are set out in the following table.

| Sample | Percent glycerides | Percent bis-2 (hydroxyethyl) tallow amine | Surface resistivity, Ω/sq., after— | | | |
|---|---|---|---|---|---|---|
| | | | 1 day | 1 week | 2 weeks | 10 weeks |
| 1 | 2 | | ∞ | ∞ | 1.10$^{14}$ | 5.10$^{13}$ |
| 2 | | 0.15 | ∞ | ∞ | ∞ | ∞ |
| 3 | 2 | 0.15 | 1.10$^{14}$ | 5.10$^{11}$ | 1.10$^{11}$ | 1.10$^{11}$ |
| 4 | 2 | 0.25 | 1.10$^{14}$ | 3.10$^{11}$ | 1.10$^{11}$ | 1.10$^{11}$ |

EXAMPLE 4

Example 3 was repeated replacing the bis-2 hydroxyethyl tallow amine with bis-(2 hydroxyethyl)myristyl amine. The results obtained are set out in the following table.

| Sample | Percent glycerides | Percent bis(2 hydroxyethyl) myristyl amine | Surface resistivity, Ω/sq., after— | | |
|---|---|---|---|---|---|
| | | | 1 day | 1 week | 6 weeks |
| 1 | 2 | | ∞ | ∞ | 9.10$^{13}$ |
| 2 | | 0.12 | ∞ | ∞ | ∞ |
| 3 | 2 | 0.12 | 1.10$^{13}$ | 4.10$^{11}$ | 1.10$^{11}$ |
| 4 | 1 | 0.12 | 5.10$^{14}$ | 5.10$^{12}$ | 1.10$^{12}$ |

Example 5

Example 4 was repeated using a block copolymer of propylene and ethylene containing about 4% by weight of ethylene in place of the propylene homopolymer. The results obtained are set out in the following table.

| Sample | Percent glycerides | Percent bis(2 hydroxyethyl) myristyl amine | Surface resistivity, Ω/sq., after— | | |
|---|---|---|---|---|---|
| | | | 1 day | 1 week | 6 weeks |
| 1 | 2 | | ∞ | ∞ | 1.10$^{14}$ |
| 2 | | 0.1 | ∞ | ∞ | ∞ |
| 3 | 2 | 0.1 | 3.10$^{13}$ | 6.10$^{11}$ | 1.10$^{11}$ |

Example 6

Film was made from a random copolymer of ethylene and propylene containing 2½% by weight of ethylene. The film contained various combinations of additives and the surface resistivities of the films obtained are set out below.

| Sample | Percent glycerides | Percent bis 2 (hydroxyethyl) myristyl amine | Percent bis 2 (hydroxyethyl) tallow amine | Surface resistivity, Ω/sq., after— | | |
|---|---|---|---|---|---|---|
| | | | | 1 day | 1 week | 5 weeks |
| 1 | 2 | | | ∞ | ∞ | 1.10$^{14}$ |
| 2 | | 0.1 | | ∞ | ∞ | ∞ |
| 3 | 2 | 0.1 | | 5.10$^{13}$ | 4.10$^{11}$ | 2.10$^{11}$ |
| 4 | | | 0.3 | | | 1.10$^{12}$ |
| 5 | 2 | | 0.3 | 5.10$^{12}$ | 3.10$^{11}$ | 9.10$^{10}$ |

Example 7

Biaxially oriented polypropylene film containing 0.1% by weight of bis(2-hydroxy-ethyl)myristyl amine and 2% by weight of glyceryl mono-stearate was prepared by the well known tubular process and discharge treated as in Example 1. The surface resistivity of the film was meausred after 5 weeks and 20 weeks and found to be $1 \times 10^{13}$ ohms/sq. and $2 \times 10^{13}$ ohms/sq. respectively.

I claim:

1. A film of a thermoplastic polymer having coated thereon a composition comprising a mixture of (a) one or more substances having the formula

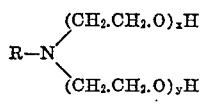

wherein the sum of $x$ and $y$ has a value from 2 to 5 inclusive and R is a monovalent aliphatic radical having from 12 to 22 carbon atoms inclusive and (b) one or more glycerides selected from the group consisting of glyceryl monostearate and glyceryl monobehenate.

2. A film of a thermoplastic polymer having incorporated therein (a) from 0.01% to 2% by weight of one or more substances of the formula

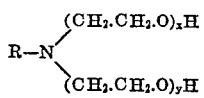

where the sum of $x$ and $y$ has a value from 2 to 5 inclusive and R is a monovalent aliphatic radical having from 12 to 22 carbon atoms and (b) from 0.1% to 5% by weight of one or more glycerides selected from the group consisting of glyceryl monostearate and glyceryl monobehenate, the percentages being based on the weight of the film.

3. A film according to claim 2 in which the compound of the formula

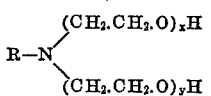

is selected from the group consisting of bis(2-hydroxyethyl) myristyl amine and bis(2-hydroxyethyl) tallow amine.

4. A film according to claim 2 in which the thermoplastic polymer is a polyolefine.

5. A film according to claim 4 in which the film is of polypropylene.

6. A film according to claim 2 in which the film is oriented.

7. A film according to claim 2 the surface of which has been subjected to corona dicsharge treatment.

References Cited

UNITED STATES PATENTS

| | | | |
|---|---|---|---|
| 2,809,159 | 10/1957 | Welles et al. | 252—8.8 |
| 2,992,199 | 7/1951 | Coler et ol. | 260—23 AX |
| 3,248,258 | 4/1966 | Coats | 252—8.9 |
| 3,425,976 | 2/1969 | Adams et al. | 260—23 AX |
| 3,499,856 | 3/1970 | Funatsu | 260—23 H |
| 3,574,156 | 4/1971 | Wagner et al. | 260—23 H |

RALPH HUSACK, Primary Examiner

U.S. Cl. X.R.

106—244; 117—7, 93.3, 122 H, 138.8 UA, F, 167; 260—23H, XA, P